E. E. DUNGAN & D. B. JOHNSON.
SPHERE TESTING DEVICE.
APPLICATION FILED NOV. 20, 1913.
1,099,917.
Patented June 16, 1914.
2 SHEETS—SHEET 1.
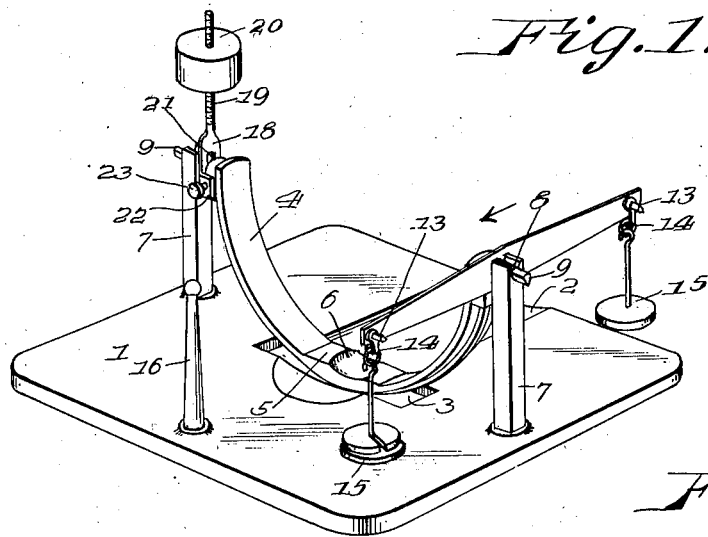
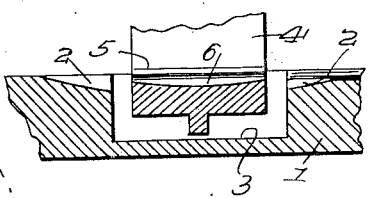
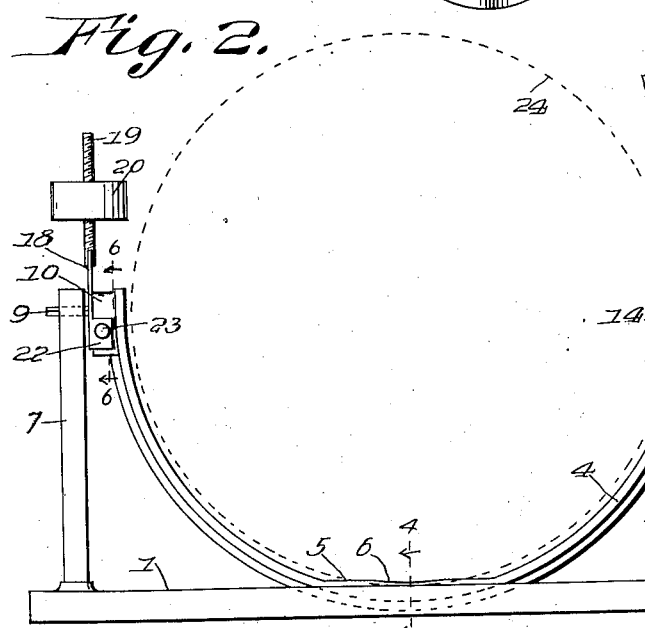
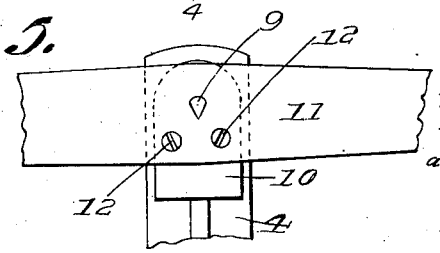
Witnesses
R. R. Bond
M. A. Bond
Inventors
Elmer E. Dungan
and David B. Johnson,
E. H. Bond
Attorney E. E. DUNGAN & D. B. JOHNSON.
SPHERE TESTING DEVICE.
APPLICATION FILED NOV. 20, 1913.
1,099,917.
Patented June 16, 1914.
2 SHEETS—SHEET 2.
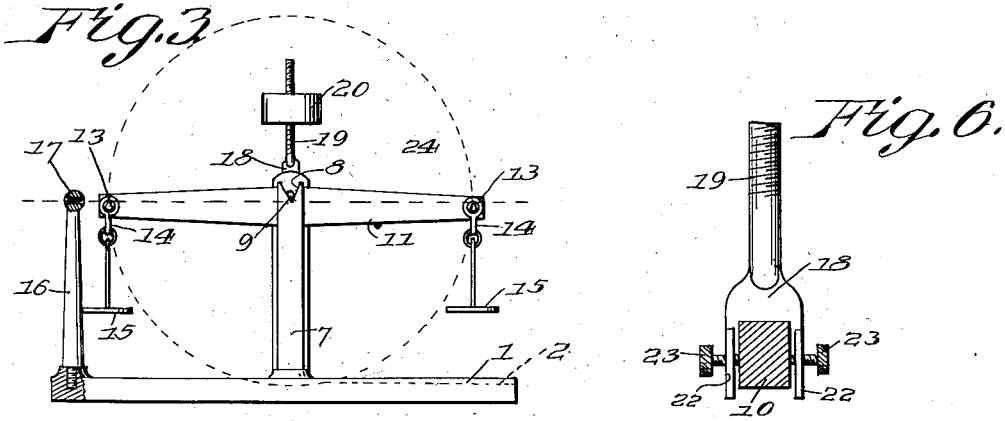
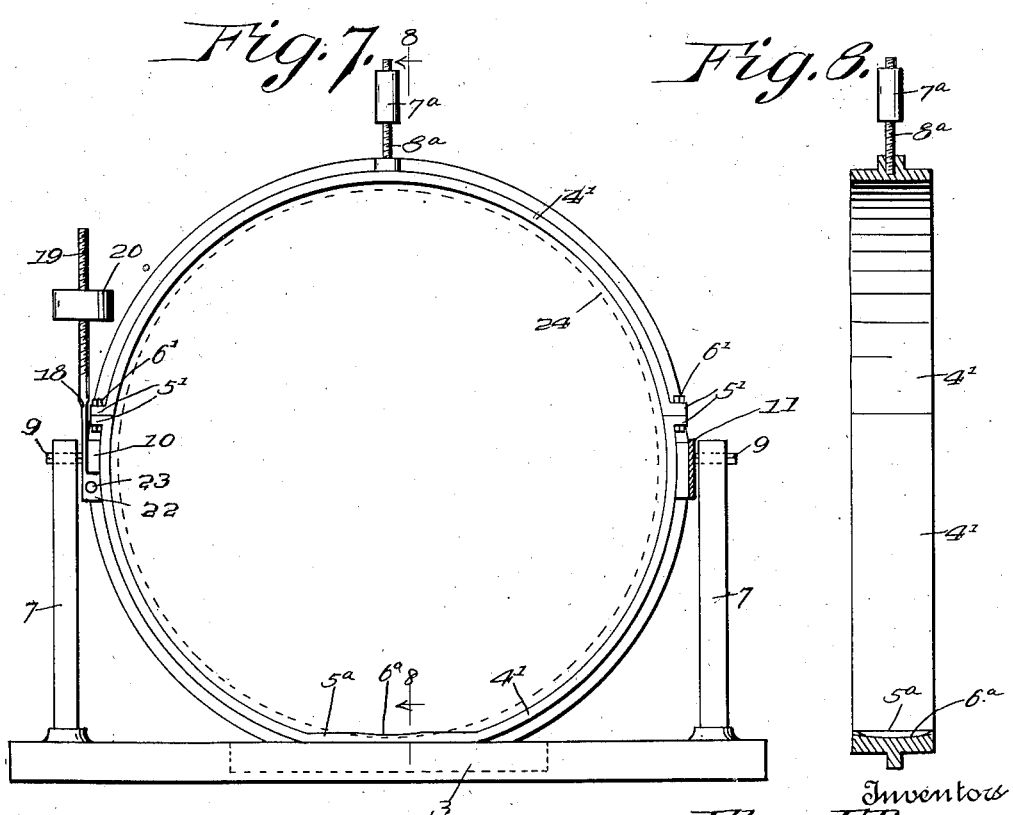
Witnesses
R. R. Bond
M. A. Bond
Inventors
Elmer E. Dungan
and David B. Johnson,
E. K. Bond
Attorney

UNITED STATES PATENT OFFICE.

ELMER E. DUNGAN, OF PHILADELPHIA, AND DAVID B. JOHNSON, OF AMBLER, PENNSYLVANIA.

SPHERE-TESTING DEVICE.

1,099,917.  Specification of Letters Patent.  Patented June 16, 1914.

Application filed November 20, 1913. Serial No. 802,105.

*To all whom it may concern:*

Be it known that we, ELMER E. DUNGAN and DAVID B. JOHNSON, citizens of the United States of America, and residents of Philadelphia, county of Philadelphia, and State of Pennsylvania, and Ambler, county of Montgomery, State of Pennsylvania, respectively, have invented certain new and useful Improvements in Sphere-Testing Devices, of which the following is a specification.

This invention relates to a device for testing sphere balance or weighing sphere balance excess.

The device hereinafter described and forming the subject-matter of this application is designed particularly for use to make effective rules of the various bowling associations of the United States, and elsewhere, (now existing but practically inoperative), as applied to "loaded" or "dodo" or any actually unbalanced bowling ball.

Regulation bowling balls are now not over twenty-seven inches in circumference nor over sixteen pounds in weight, which conditions are easily determined, and the present invention has for its objects among others to allow one to readily determine the excess of weight, on whichever side it may appear.

If normally manufactured composition or wooden balls prove, by test, to vary as much as say two ounces, a rule will be made limiting such variation to two ounces and the present invention is designed to determine, without dispute or human guessing, just what the variation is.

As is well-known in this art, all balls vary in their center of gravity, and each man generally bowls his own private ball. A habit very harmful to fairness and to the conduct of the game has grown up of loading or so unbalancing the ball that as its spends its speed and approaches the pins it takes an unnatural and more destructive course. It is strongly desired to prevent this and to regulate the ball in this particular, thereby rendering to all devotees of the game an equal chance to score. The device is also useful toward the truing up of the center of gravity of all balls used for delicate purposes, of any size or weight; billiard balls, for instance, can be readily treated so as to determine the excess of weight or variation and hence where in the appended description and claims reference is made to a "bowling ball", it is to be understood that such term is employed merely by way of example and without any intent to limit the invention to its use for determining the excess of balance in a bowling ball.

Other objects and advantages of the invention will hereinafter appear and the novel features thereof will be particularly pointed out in the appended claims.

The invention is capable of embodiment in a variety of forms, of various sizes, those herein illustrated being what we at the present time consider preferable, but are given merely as illustrations of some forms of embodiment of the invention.

In such drawings, Figure 1 is a perspective view of a device constructed in accordance with our present invention. Fig. 2 is a view looking in the direction of the arrow in Fig. 1, with a ball indicated in position in dotted lines. Fig. 3 is a view at right angles to Fig. 2 on a smaller scale. Fig. 4 is a vertical section, as on the line 4—4 of Fig. 2. Fig. 5 is a fragmentary elevation showing a portion of the scale beam. Fig. 6 is a vertical section on the line 6—6 of Fig. 2. Fig. 7 is a view similar to Fig. 2 showing a modified form of construction. Fig. 8 is a vertical section on the line 8—8 of Fig. 7 looking in the direction of the arrows.

Like numerals of reference indicate like parts throughout the different views.

Referring to the drawings, 1 designates a base of any suitable character designed to form a support for the remaining elements of the device. This base may or may not be provided with the curved depression 2 opening at one side and forming a runway for the ball. Such circular depression is shown in Fig. 1. At the inner end of this runway and extending transversely thereto there is in the base a depression or opening 3 which serves to bring the curved member 4 down nearer the base and also the side walls of such depression or opening form limiting means which control the movement of the said curved member. This curved member is formed substantially on the arc of the circular face of the ball and at its center or lowest point it is provided with a flattened surface 5 which has a central cavity 6 upon which the ball is held and prevented from becoming displaced.

7 are standards or uprights rising from the base at diametrically opposite sides, as seen in Figs. 1, 2 and 7. While these may be supported in any suitable manner, we have chosen in the present instance to show them as screw threaded into the base, as seen in Fig. 2, whereby they may be readily removed to save space in storing or transportation. The upper ends of these uprights or standards are provided with V-shaped notches 8, as seen in Figs. 1 and 3, which receive the knife bearings 9 which are rigid with the member 4, the member 4 being detachably mounted and supported upon these uprights so that the said member may be readily removed for storage or shipment.

The member 4 is provided at each end with a block or enlargement 10, and to one of these blocks is secured a scale beam 11 affixed thereto in any suitable manner, as by the screws 12, as shown clearly in Fig. 5. At each end of the scale beam is a knife bearing 13, from which are suspended the links or hangers 14 which sustain the weight supports 15 which may be of any well-known or approved type. The horizontal line will pass through the upper knife edges of the knife bearings 13, 13 and the lower edge of the knife bearing 9, as indicated by dotted line in Fig. 3.

At one side of the base, preferably in line with the central point of the depression 6, is a post 16, affixed to the base in any suitable manner, but in this instance shown as screw-threaded, see Fig. 3, so as to be readily removed for storage or shipment, as well as for vertical adjustment. This post may be provided at its upper end with an opening 17 extending therethrough, providing a sight opening through which it may be readily ascertained when the edges of the knife bearings 13, 13 and 8 are in alinement, as will be readily understood upon an inspection of Fig. 3.

18 is an arm disposed substantially vertically, screw-threaded at its upper end, as seen at 19, upon which is adjustably mounted a weight 20, said arm being provided with a vertical slot 21 through which passes the knife bearing 9 at that end of the member 4, said arm 18 having the right-angled flanges 22, as seen clearly in Figs. 1, 2 and 6, which loosely embrace the block or enlargement 10 of the member 4 at that end, set screws 23 being provided, as shown, which pass through the flanges 22 and bear against opposite sides of the block or enlargement 10. This provides efficient means for adjustment of the member 4 to centralize it between the side walls of the opening or recess 3 in the base 1. Manipulation of these screws will serve to throw the member 4 one way or the other and to hold the same in such position.

In practice, the sphere or bowling ball represented by 24 in dotted lines in Figs. 2 and 3 is first placed in a bath of mercury or the like, or upon a smooth plane surface, to determine, in a well-known way, the "light" side of the ball. The ball is then placed upon the member 4, resting in the cavity 6 with the "light" side toward the post 16, this, however, being merely a matter of convenience, for it will be readily understood that the ball may be placed with the heavy side toward such post. The weights are then applied to the side of the scale beam opposite the heavy side until the excess of balance is determined. In practice, it may be possible that in determining the excess, it will only be necessary to place upon the "light" side say a two ounce weight, or such weight as may be predetermined as the allowed excess, and then if the machine shows a greater excess the ball is thrown out as not permissible for use.

It is to be noted that the knife centers are so disposed as to be on a line with the axis or a line drawn through the diameter of the ball. Also the point of suspension of the weight pans or supports 15 are a distance apart corresponding to the diameter of the ball to be tested.

It is to be understood that if balls of smaller diameter are to be tested, a machine will be provided in which the radius of the member 4 will be correspondingly reduced and the distance between the knife centers of the scale beam will also be correspondingly reduced.

The adjustable weight 20 serves as a counterbalance for the member 4, as will be readily understood.

In some instances we may desire to make the ball support in the form of a complete circle instead of a semi-circle as in Fig. 1. Such a construction is seen in Figs. 7 and 8 wherein the member 4' is composed of two parts having flanges 5' by which they are detachably united by screws or bolts or the like 6'. The lower section has a flattened portion 5$^a$ and a central depression 6$^a$, as seen in both Figs. 7 and 8. In other respects the parts are the same but in some instances we provide the upper section 4$^a$ with an adjustable counterbalance 7$^a$ mounted upon a screw-threaded rod 8$^a$ adjustably and detachably mounted in the said upper section. For the sake of convenience, the weight supports and their connections are omitted from Fig. 7.

From the foregoing, it will be readily understood that we have devised a simple and efficient, cheap yet durable and reliable device for accomplishing the ends hereinbefore named, and while the structural embodiment of the invention as hereinbefore set forth is what we at the present time consider preferable, it is evident that the same is subject to changes, variations, modifications in detail, proportion of parts, relative arrangement, etc., without departing from the spirit of the invention or sacrificing any of its advantages. We, therefore, do not intend to restrict ourselves to the precise construction hereinbefore described, but reserve the right to make such changes, variations and modifications as come properly within the scope of the protection prayed.

What is claimed as new is:—

1. A machine for testing sphere balance excess, comprising a pivotally mounted sphere supporting member adapted to hold a sphere with its center in the axis of the pivots of said supporting member, and a scale beam movable therewith.

2. A machine for testing sphere balance excess, comprising a pivotally mounted sphere supporting member adapted to hold a sphere with its center in the axis of the pivots of said supporting member, a scale beam movable therewith, and an adjusting device for said member.

3. A machine for testing sphere balance excess, comprising suspended means for supporting the sphere with its center in the axis of the fulcrums of said means, and means movable therewith for determining the excess balance.

4. A machine for testing sphere balance excess, comprising suspended means for supporting the sphere with its center in the axis of the fulcrums of said means, means movable therewith for determining the excess balance, and a counterbalance for said suspended means.

5. In a machine for testing sphere balance excess, a curved suspended sphere support adapted to hold a sphere with its center in the axis of the pivots of said support, and a scale beam movable therewith and provided with means for determining the balance excess.

6. In a machine for testing sphere balance excess, a curved suspended support for a sphere, and a scale beam movable therewith and provided with means for determining the balance excess, the pivots of said sphere support being in axial alinement with the axis of the sphere being tested.

7. In a machine for testing sphere balance excess, a curved suspended sphere support adapted to hold the ball with its center in the axis of the fulcrums of said support, and a scale beam movable therewith and provided with means for determining the balance excess, the scale beam having the bearings of its weight support spaced according to the diameter of the sphere to be tested.

8. In a machine for testing sphere balance excess, a base, uprights thereon, a curved sphere support mounted on knife bearings in said uprights and having a central cavity to receive a sphere and adapted to hold the same with its center in the axis of the fulcrums of said support, and a scale beam mounted on one of said knife bearings and movable with the support.

9. In a machine for testing sphere balance excess, a base, uprights thereon, a curved sphere support mounted on knife bearings in said uprights and having a central cavity to receive a sphere, and a scale beam mounted on one of said knife bearings and movable with the support, said knife bearings being in axial alinement with the axis of the sphere being tested.

10. In a machine for testing sphere balance excess, a base, uprights thereon, a curved sphere support mounted on knife bearings in said uprights and having a central cavity to receive a sphere, a scale beam mounted on one of said knife bearings and movable with the support, said knife bearings being in axial alinement with the axis of the sphere being tested, and a counterbalance for said sphere support.

11. In a machine for testing sphere balance excess, a base, uprights thereon, a curved sphere support mounted on knife bearings in said uprights and having a central cavity to receive a sphere and adapted to hold the same with its center in the axis of the bearings of said support, a scale beam mounted on one of said knife bearings and movable with the support, and means for lateral adjustment of said support.

Signed by us at Fort Washington, Pa. this 18th day of November 1913.

ELMER E. DUNGAN.
DAVID B. JOHNSON.

Witnesses:
KATHARINE C. BICKNELL,
WM. B. RHOADS.